United States Patent [11] 3,609,186

[72] Inventor Swiatoslaw Trofimenko
 Wilmington, Del.
[21] Appl. No. 753,855
[22] Filed Aug. 20, 1968
[45] Patented Sept. 28, 1971
[73] Assignee E. I. du Pont de Nemours and Company
 Wilmington, Del.

[54] BORYL SULFONATES AND SULFATES
 12 Claims, No Drawings
[52] U.S. Cl. .................................................. 260/545 R,
 260/310 R, 260/311, 260/462 R, 260/551 B
[51] Int. Cl. .......................................................... C07f 5/02
[50] Field of Search .......................................... 260/545,
 459

[56] References Cited
 OTHER REFERENCES

Gabeau et al., Zeitschript Fuer Anorganische Und Allegmeine Chemie 322 224 (1963)
Steinberg et al., Progress in Boron Chemistry. 399, (1964)
Umland et al. C.A. 60, 9f, 1964

Primary Examiner—Lewis Gotts
Assistant Examiner—Robert Gerstl
Attorney—James W. Ryan ABSTRACT: Dihydrocarbylboryl sulfonates and bis(dihydrocarbylboryl) sulfonates and sulfates, e.g., diethylboryl p-toluene sulfonate, bis(diethylboryl) 4,4'-biphenyldisulfonate and bis(diethylboryl) sulfate, useful as transfer agents for the hydrocarbylboryl groups, are prepared by reaction between selected hydrocarbylboranes and an anhydrous sulfonic or sulfuric acid.

BORYL SULFONATES AND SULFATES

BACKGROUND OF THE INVENTION

1. Field of the Invention

This invention relates to the novel classes of chemical compounds denominated hydrocarbylboryl sulfonates and hydrocarbylboryl sulfates.

2. Description of the Prior Art

So far as is known, the compounds of this invention are new and no reference to them exists in the chemical or patent literature.

SUMMARY AND DETAILS OF THE INVENTION

The new compounds of this invention are the hydrocarbylboryl sulfonates of the formula

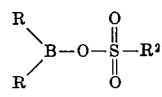

(I)

bis (dihydrocarbylboryl) sulfonates of the formula

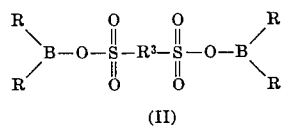

(II)

and the bis (dihydrocarbylboryl) sulfates of the formula

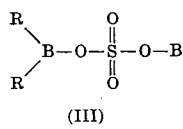

(III)

wherein

R is a monovalent hydrocarbyl group of up to 12 carbon atoms;

$R^2$ is a monovalent hydrocarbyl or substituted hydrocarbyl group of up to 16 carbon atoms; and $R^3$ is a divalent hydrocarbyl group of up to 16 carbon atoms.

Preferred groups for R are alkyl, aryl, alkaryl, aralkyl and cycloalkyl of up to eight carbon atoms. The groups preferred for $R^2$ are alkyl, aryl, alkaryl, haloaryl and nitroaryl of up to 12 carbon atoms. The preferred groups for $R^3$ are arylene and alkyl-substituted arylene.

The new compounds of this invention are generally prepared by the reaction of a borane of formula $XBR^2$, where B is a boron atom, X is a leaving group which may be hydrogen, alkyl, aryl or halogen and R and $R^1$ are as previously designated, with an appropriate anhydrous sulfonic or sulfuric acid in inert solvent. The reactions whereby the various compounds of this invention may be prepared can be represented schematically as follows, the symbols having the previously stated significance:

(1)

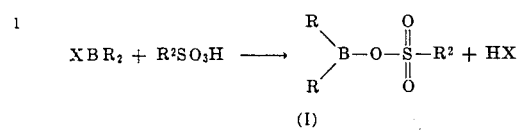

(I)

(2)

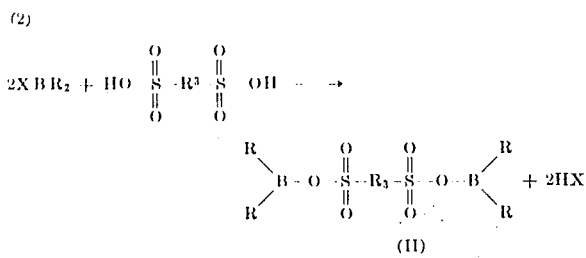

(II)

(3)

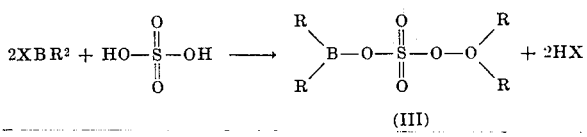

(III)

The process consists of heating together the borane of formula $XBR^2$ and the appropriate anhydrous sulfonic or sulfuric acid, preferably in the presence of an inert solvent, until one equivalent (two equivalents in the case of reactions 2 and 3, above) of HX has been evolved. This assumes, of course, that X, being the most labile group in the borane molecule, will undergo displacement most readily. The resulting solution of known molarity, determinable from the amounts of reactants and total volume used, can be stored and used as such. Alternatively, the hydrocarbylboryl sulfonates and sulfates of this invention may be isolated by the evaporation of the inert solvent or in appropriate instances by distillation.

Since most boranes are sensitive to air and moisture, these reactions should be conducted in a dry, oxygen-free atmosphere. Likewise it is necessary that the products be handled in a dry inert atmosphere. Blanketing the reaction vessel with dry nitrogen, argon, helium, hydrogen, methane or other gases unreactive toward either of the reactants or the product is recommended. Solutions of the hydrocarbylboryl sulfonates or sulfates are less sensitive to air and moisture and are easier to handle.

The choice of a solvent in which to carry out the reaction of borane and sulfuric acid depends upon the temperature at which the reaction best proceeds. The solvent should be selected such that its boiling point is slightly above the temperature at which the evolution of HX proceeds at a satisfactory rate. Solvents such as the aliphatic and aromatic hydrocarbons, halocarbons and ether may be used. Preferred as solvents are the aromatic hydrocarbons, particularly toluene. Toluene is especially suitable as a reaction solvent because of the azeotrope it forms with water. Since anhydrous sulfonic acids are necessary for the preparation of the compounds of this invention and since most sulfonic acids are hydrated to varying degrees, it is both convenient and necessary to dehydrate then in situ in the reaction vessel by azeotropic distillation of water. Toluene forms a suitable azeotrope. Whenever the sulfonic acid hydrate is of known composition, the amount of water evolved on azeotropic distillation can be measured by the use of a Dean-Stark trap or other appropriate device. If the amount of water in the hydrate is nonstoichiometric (and, in general, this is the case), the dehydration should be carried to the point where the evolution of water ceases.

The progress of the reaction between borane and sulfonic acid can be followed conveniently when HX is a gas or a low-boiling liquid by measuring its evolution volumetrically using a wet-test meter or some other suitable device. The reaction is usually carried out at atmospheric pressure, though it could also be carried out in an autoclave at higher pressures. Reaction temperature can range from 0° C. for reactive boranes to the decomposition temperature of the product, usually a temperature in the neighborhood of 200° C. The preferred range for reaction temperature is 80°–140° C., such temperatures being maintained throughout the course of reaction by selecting an aromatic solvent of appropriate boiling point.

The borane reactants employed in the preparation of the compounds of this invention can be prepared by a variety of synthetic approaches known in the art. Many of these are detailed in the article entitled, "Organic Compounds of Boron," by M. F. Lappert, found at Chem. Revs., 56, 959 (1956). A number of the borane reactants used, for example, triethylborane, tributylborane, triphenylborane, etc., are commercially available.

The sulfonic acid reactants may also be prepared by methods well known in the art; likewise many of them, for example, methanesulfonic acid, the toluenesulfonic acids, the chlorobenzenesulfonic acids and the nitrobenzenesulfonic acids, are available commercially.

SPECIFIC EMBODIMENTS OF THE INVENTION

There follow some nonlimiting examples illustrative of the invention.

The boryl sulfonates and boryl sulfates of this invention are all sensitive to air, some to the point of being pyrophoric. Although this factor occasionally makes characterization by simple elemental analysis impracticable, the compounds are readily characterized by:

a. the stoichiometry of HX evolution;
b. the proton *nmr* spectrum of the product obtained on distillation; and/or
c. the reaction of the product with oxamidines and 2,5-bisalkylamino-1,4-benzoquinones in the presence of sodium hydride at room temperature, characteristic of the $R_2BZ$ structure where Z is a good departing ion (in this case $RSO_3^1$).

In these examples, temperatures are given in degrees centigrade, and the compound potassium dihydrobis(1-pyrazolyl)-borate is represented as $KH_2B(pz)_2$.

Example 1

A suspension of 38 g. (0.2 mole) of p-toluenesulfonic acid monohydrate was stirred and refluxed in 250 ml. of toluene, water being removed through a Dean-Stark trap. When all water was removed, the solution was cooled, 28.2 ml. (0.2 mole) of triethylborane were added and heating was recommenced. Ethane was evolved steadily at reflux. When 5 l. (0.2 mole) were evolved, the solution was cooled.

The stoichiometry of ethane evolution supported formation of diethylboryl p-toluenesulfonate.

Example 2

A solution of diethylboryl p-toluenesulfonate was prepared as in example 1. It was added dropwise to a solution of 40 g. (0.2 mole) of potassium dihydrobis(1-pyrazolyl)borate in 400 ml. of dry tetrahydrofuran. The mixture was refluxed briefly and was then poured into 1 l. of water. The layers were separated, and the aqueous layer was extracted twice with hexane. The combined organic extracts were dried, filtered and stripped. The residual solid was distilled in vacuo. The main cut, b.p. 105–112°/3.7 mm., was obtained in 25 g. (38 percent) yield and had an infrared spectrum identical with that of authentic 4,4-diethylpyrazabole.

An authentic sample of 4,4-diethylpyrazabole was prepared as follows:

To 30 ml. (0.4 mole) of trifluoroacetic acid stirred in 200 ml. of benzene there was added 56.4 ml. of triethylborane. Evolution of ethane commenced and preceded vigorously, requiring temporary moderation of the reaction by cooling. When 9.6 l. of ethane had been evolved, a tetrahydrofuran solution of 75 g. (0.4 mole) of $KH_2B(pz)_2$ was added. An exothermic reaction took place. Tetrahydrofuran was distilled out until the volume of the reaction mixture was down to 250 ml. The mixture was stirred with water and the product extracted with ether. The ether extracts were dried and stripped, and the residue was distilled over a short-path still. The main cut boiled at 110°–140°/2.7 mm. and was obtained in 62 g. (72 percent) yield. The product solidified at room temperature and was purified by recrystallization from hexane; m.p. 61°–62°.

*Anal.* Calcd. for $C_{10}H_{18}B_2N_4$: C, 55.5; H, 8.33; N, 25.9.
Found: C, 55.5; H, 8.15; N, 26.2.

The *nmr* spectrum was confirmatory: doublet ($J$=2.5) 2.43τ, triplet ($J$=2.3) 3.69τ and a tripletlike peak at 9.34τ in 4:2:10 ratio. The $BH_2$ hydrogens (relative intensity 2) are visible by integration in the 3–10τ area.

The $B^{11}$ *nmr* has a broad peak at +16.5 p.p.m. and an unresolved triplet at +26.6 p.p.m. (from trimethyl borate).

Example 3

Dibutylboryl p-toluenesulfonate was prepared as in example 1, substituting an equivalent amount of tributylborane for triethylborane. Reaction of this product with $KH_2B(pz)_2$ was carried out as in example 2. The product was purified by distillation in vacuo. The following cuts were collected:
A. b.p. 128°/0.9 mm.; $n_D^{25}$: 1.5042; yield 9.6 g.
B. b.p. 142°–144°/1.7 mm.; $n_D^{25}$; 1.5029; yield 18.1 g.
C. b.p. 170°/2.7 mm.; $n_D^{25}$: 1.5009; yield 5.7 g.

Fractions A and B had identical infrared spectra and were both pure 4,4-dibutylpyrazabole.

*Anal.* Calcd. for $C_{14}H_{26}B_2N_4$; C, 61.8; H, 9.57; N, 20.6
Found (A): C, 61.7; H, 9.86; N, 20.8
Found (B): C, 61.8; H, 9.94; N, 20.6

The *nmr* spectra of fractions A and B were also in accord with the 4,4-dibutylpyrazabole structure: doublet ($J$=2.4, $J'$= 0.7) 2.47τ, triplet ($J$=2.4) 3.78τ and a multiplet around 9 with sharp peaks at 9.14 and 9.23τ in 2:1:9 ratio. The $BH_2$ hydrogens could be seen by integration. The *nmr* of fraction C showed contamination by 4,4,8,8-tetrabutylpyrazabole.

Example 4

To a nitrogen-blanket mixture of 40 g. (0.4 mole) of practical grade methanesulfonic acid in 300 ml. toluene there was added 56.8 ml. (0.4 mole) of triethylborane. The two-layer mixture was stirred and refluxed until it became homogeneous and 10 l. of ethane were evolved. The solvent was stripped off at reduced pressure leaving an air-sensitive liquid which was distilled in vacuo. The main cut boiled at 70°–73°/2.5 mm. The compound was pyrophoric.

The *nmr* spectrum of a neat sample of the product was confirmatory for diethylboryl methanesulfonate with only two peaks: a sharp singlet at 7.05τ and the characteristic $BEt_2$ multiplet at 9.1τ in the correct 3:10 ratio.

Example 5

Methanesulfonic acid (70 g.; 0.7 mole) was stirred and refluxed in 300 ml. of toluene until water evolution ceased. The solution was cooled under nitrogen and 100 ml. (0.7 mole) of triethylborane were added. The solution was then stirred and refluxed until 18.1 l. of ethane were evolved. The resulting solution, approximately 1.7 molar in diethylboryl methanesulfonate, was cooled and bottled.

The conversion of diethylboryl methanesulfonate to N-diethylboryl-sym-tetraphenyloxamidine was carried out as follows:

To a stirred suspension of 1.4 g. of 56 percent commercial sodium hydride (0.033 mole) in 250 ml. of dry 1,2dimethoxyethane there was added 13.0 g. (0.003 mole) of sym-tetraphenyloxamidine. Evolution of hydrogen commenced at room temperature and stopped after 0.8 l. was evolved. At this point 20 ml. of the above 1.7 molar diethylboryl methanesulfonate solution were added. An exothermal reaction took place, and the flask contents started gelling. The mixture was stirred and shaken for 15 minutes. Water (500 ml.) was then added and the product was extracted with benzene. The extracts were concentrated to 40 ml. and rapidly chromatographed on acid-washed alumina, using hexane as the eluant. The yellow band was collected and stripped and the residue was triturated with hexane and filtered. There was obtained a total of 11.1 g. (73.6 percent) of N-diethylboryl-sym-tetraphenyloxamidine.

*Anal.* Calcd. for $C_{30}H_{31}BN_4$: C, 78.5; H, 6.77; N, 12.2
Found: C, 78.5; H, 6.57; N, 12.4

Example 6

Mesitylenesulfonic acid (20 g.; 0.1 mole) was stirred and refluxed in 250 ml. of toluene, water being removed through a Dean-Stark trap. When water ceased to be evolved, 14.2 ml. (0.1 mole) of triethylborane were added under nitrogen, and the solution was refluxed until 2.5 l. of ethane were evolved. This procedure gave a 0.4 molar solution of diethylboryl mesitylenesulfonate.

A 50-ml. portion of this solution was added to a reaction mixture prepared by stirring under nitrogen 3.9 g. (0.01 mole) of sym-tetraphenyloxamidine and 0.86 g. of 56 percent sodium hydride (mineral oil suspension) in 200 ml. of dry tetrahydrofuran. The reaction mixture was stirred at room temperature for approximately 1 hour. 10 ml. methanol were added carefully to consume any residual sodium hydride, followed by 300 ml. of water. The mixture was extracted with benzene and the extracts were stripped.

The crude product was purified by chromatography on acid-washed alumina eluting with a 1:1 hexane-ether mixture. A yellow band migrated rapidly. It was collected and the solvent stripped off. Trituration with hexane gave yellow crystals in 4.2 g. (91 percent) yield which were purified by recrystallization from heptane, m.p. 184°–185°.

The infrared spectrum of the product had an NH band at 3250 cm$^{11}$. The nmr spectrum was confirmatory for N-diethylboryl-sym-tetraphenyloxamidine, the compound of example 5, with a singlet at 0.83τ, phenyl multiplet at about 3.1τ and the B-ethyls as a multiplet at about 9.3τ in the correct 1:20:10 ratio.

Example 7

The preparation of diethylboryl p-nitrobenzenesulfonate was carried out as in example 6, using 0.1 mole of p-nitrobenzenesulfonic acid and 0.1 mole of triethylborane. The conversion of diethylboryl p-nitrobenzenesulfonate to N-diethylboryl-sym-tetraphenyloxamidine was likewise effected as in example 6. This product was obtained in 89 percent yield.

Example 8

The preparation of diethylboryl m-nitrobenzenesulfonate was carried out as in example 6 using 0.1 mole of m-nitrobenzenesulfonic acid and 0.1 mole of triethylborane. The conversion of diethylboryl m-nitrobenzenesulfonate to N-diethylboryl-sym-tetraphenyloxamidine was likewise effected as in example 6. This product was obtained in 63 percent yield.

Example 9

The preparation of bis(diethylboryl) 4,4'-biphenyldisulfonate was carried out as in example 6, using 0.05 mole 4,4'-biphenyldisulfonic acid and 0.1 mole triethylborane. This product was converted to N-diethylboryl-sym-tetraphenyloxamidine in 71 percent yield.

Example 10

The preparation of diethylboryl 2-naphthalenesulfonate was carried out as in example 6 using 0.1 mole of 2-naphthalenesulfonic acid and 0.1 mole of triethylborane. The conversion of diethylboryl 2-naphthalenesulfonate to N-diethylboryl-sym-tetraphenyloxamidine was likewise effected as in example 6. This product was obtained in 56 percent yield.

Example 11

The preparation of diethylboryl p-chlorobenzenesulfonate was carried out as in example 6 using 0.1 mole of p-chlorobenzenesulfonic acid and 0.1 mole of triethylborane. The conversion of diethylboryl p-chlorobenzenesulfonate to N-diethylboryl-sym-tetraphenyloxamidine was likewise effected as in example 6. This product was obtained in 59 percent yield.

Example 12

To a suspension of 2.8 g. of 56 percent sodium hydride (0.066 mole) in 250 ml. of dry 1,2-dimethoxyethane, there were added via Gooch tubing 13.0 g. (0.033 mole) of sym-tetraphenyloxamidine. Brisk evolution of hydrogen took place at room temperature and soon 0.8 l. was evolved. The mixture was heated to reflux with stirring whereupon a second 0.8 l. of hydrogen was evolved. The amber solution was cooled to room temperature and 44 ml. of a 1.7 molar solution of diethylboryl methanesulfonate in toluene was added. An exothermic reaction took place and sodium methanesulfonate began to precipitate. The reaction mixture was stirred at room temperature for 15 min.; some methanol was then added followed by water to decompose any residual sodium hydride and diethylboryl sulfonate. The flask contents were poured into a large excess of water and the product was extracted with benzene. The benzene extracts were stripped yielding, after trituration with hexane, 13.8 g. (80 percent) of a grayish solid with an infrared spectrum identical with that of authentic bisdiethylboryl-sym-tetraphenyloxamidine. A second crop of 1.5 g. (8.7 percent) was obtained raising the overall yield to 88 percent.

Example 13

A mixture of 19.6 g. (0.2 mole) of 98 percent sulfuric acid and 300 ml. toluene was stirred and refluxed until water ceased to be collected in a Dean-Stark trap. To the reaction mixture at 90° there were added under nitrogen 57 ml. (0.4 mole) of triethylborane. When the reaction mixture reached 100°, ethane evolution became moderately rapid. When 10.1 were evolved (corresponding to the formation of bis(diethylboryl) sulfate), the reaction was stopped. The mixture at this stage was a solution of bis(diethylboryl) sulfate in toluene. The product can be isolated if desired by evaporation of the toluene.

A portion of the solution was added at room temperature to a small amount of 2,5-bis(ethylamino)-1,4-benzoquinone. The color of the solution changed immediately from dark red to yellow-orange. The solution was shaken with some aqueous sodium bicarbonate, and the organic layer was rapidly chromatographed on alumina. The yellow band was collected. Evaporation afforded a yellow solid possessing an infrared spectrum identical with that of authentic 2,5-bis(diethylborylethylamino)-1,4-benzoquinone.

Authentic 2,5-bis(diethylborylethylamino)-1,4-benzoquinone was prepared as follows:

A mixture of 19.4 g. (0.1 mole) of 2,5-bis(ethylamino)-1,4-benzoquinone and 28.2 ml. (0.2 mole) of triethylborane was refluxed in 200 ml. of xylene. Ethane was evolved briskly and continued to be evolved even after the theoretical amount was obtained; the reaction was quenched by cooling at this point. The reaction mixture was chromatographed on alumina and the bright yellow band was collected. After stripping and trituration with ether there was obtained 2.3 g. (7 percent) of bright yellow solid which was recrystallized from hexane, m.p. 146°–147° dec.

Anal. Calcd. for $C_{18}H_{32}B_2N_2O_2$: C, 65.5; H, 9.71; N, 8.48

Found: C, 65.6; H, 10.2; N, 8.40

The nmr spectrum was confirmatory for 2,5-bis(N-diethylborylethylamino)-1,4-benzoquinone; it possessed a singlet at 4.13, a quadruplet (J=7) at 6.48τ, a triplet (J=7) at 8.69τ and a single peak at 9.39τ in 1:2:3:10 ratio.

Example 14

To an anhydrous solution of p-toluenesulfonic acid prepared by dehydration of 7.8 jg. (0.041 mole) of the monohydrate in o-dichlorobenzene there were added 10 g. (0.041 mole) of triphenylborane. The reaction mixture was heated until about 4 ml. of benzene distilled out. This procedure resulted in the formation of diphenylboryl p-toluenesulfonate.

Many borane and sulfonic acid reactants other than those listed in the preceding examples are operable in the preparation of compounds of the present invention. A list of operable boranes is given in table I which follows. In cases where the substituents on boron are not alike, the reactivity (displacement) order is halogen > H > alkyl > aryl. A list of operable sulfonic and sulfuric acids operable in the process of this invention is given in table II. The listings in each of these tables are intended to be illustrative rather than exhaustive.

TABLE I

Boranes, other than those in the examples, operable in the process of this invention:

Trimethylborane
Tripropylborane
Triisopropylborane
Triisobutylborane
Tri-tert-butylborane
Tri-n-hexylborane
Tricyclohexylborane
Tri-isoamylborane
Tribenzylborane
Tri-p-tolylborane
Tri-o-tolylborane
Tri-m-tolylborane
Dimethylborane
Diethylborane
Dimethylbromoborane Dibutylbromoborane
Diphenylchloroborane
Diphenylbromoborane
Diethylfluoroborane dipropylchloroborane

TABLE II

Sulfonic and sulfuric acids operable in the process of this invention:

Ethanesulfonic acid
n-Propanesulfonic acid
n-Butanesulfonic acid
n-Pentanesulfonic acid
n-Hexanesulfonic acid
n-Nonanesulfonic acid
n-Decanesulfonic acid
n-Undecanesulfonic acid
n-Dodecanesulfonic acid
2-Propanesulfonic acid
2-Butanesulfonic acid
2-Hexanesulfonic acid
Benzenesulfonic acid
2-Methylpropanesulfonic acid
Methanedisulfonic acid
o-Toluenesulfonic acid
m-Toluenesulfonic acid
p-Ethylbenzenesulfonic acid
p-n-Propylbenzenesulfonic acid
p-Isopropylbenzenesulfonic acid
p-n-Butylbenzenesulfonic acid
3,4-Dimethylbenzenesulfonic acid
2,3-Dimethylbenzenesulfonic acid
2,4-Dimethyl-1,3-benzenedisulfonic acid
2-Methyl-4-isopropylbenzenesulfonic acid
4-Methyl-2-isopropylbenzenesulfonic acid
2,3,4-Trimethylbenzenesulfonic acid
2,4,5-Trimethylbenzenesulfonic acid
2,4,6-Trimethylbenzenesulfonic acid
2,2:-Biphenyldisulfonic acid
5,5:-Dimethyl-2,2:-biphenyldisulfonic acid
4,4'6,6'-Tetramethyl-2,2:-biphenyldisulfonic acid The compounds of this invention are remarkably useful as transfer agents of a $BR_2$ group. Other compounds that have served this purpose, such as dialkylboryl chlorides and bromides, have numerous disadvantages. They are relatively difficult to prepare, and multistep synthesis is required for their preparation. Moreover, they are prone to under go redistribution reactions and are far more sensitive to air and moisture than the boryl sulfonates and sulfates, the relative stability of which may be attributed to chelation of the $BR_2$ by the sulfonates group, viz,

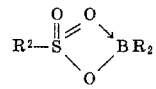

Thus, the boryl sulfonates and sulfates are useful in the synthesis of a variety of compounds containing a $BR_2$ group. An excellent example is provided by boryloxamidines (IV) and (V) covered by U.S. Pat. No. 3,326,957. These compounds may be prepared by the reaction of sym-tetrasubstituted oxamidines with trialkylboranes. However, relatively high temperatures ($\approx 100°$) are required, and monobridged boryloxamidines, (V), are prepared in only poor yield by the reaction of equimolar amounts of the oxamidine and the borane components.

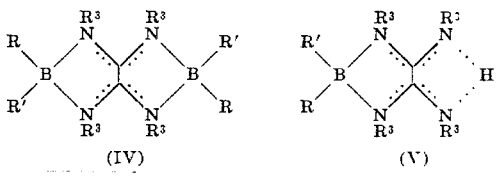

(IV)    (V)

By contrast, the boryl sulfonates of this invention can react with either preformed dianions of sym-tetrasubstituted oxamidines, or with oxamidine in the presence of sodium hydride at room temperature to yield compounds of structure (IV). Thus, compounds of class (IV) may be prepared containing thermally sensitive substituents. Monobridged oxamidines of structure (V) can be prepared readily in good yield as shown in the examples. In addition, examples are cited for the use of boryl sulfonates in the preparation of 4,4-disubstituted pyrazaboles (VI) and 2,5-bisborylaminobenzoquinones of structure (VII). In the latter case of the use of $R^2SO_3BR$ instead of triethylborane resulted in a 660 percent yield improvement of product VII ($R=R^3=$ethyl).

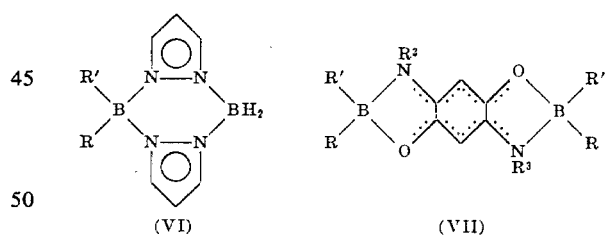

(VI)    (VII)

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of one of the formulas:

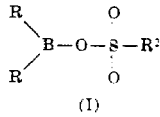

(I)

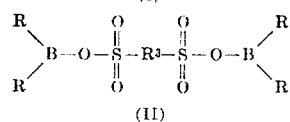

(II)

and

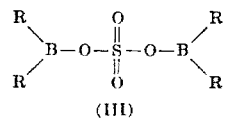

(III)

wherein:

the R's are alkyl, aryl, alkaryl, aralkyl or cycloalkyl of up to eight carbon atoms;

$R^2$ is alkyl, aryl, alkaryl, haloaryl, or nitroaryl of up to 12 carbon atoms; and $R^3$ is divalent arylene or alkyl-substituted arylene of up to 16 carbon atoms.

2. The compound of claim 1 named diethylboryl p-toluenesulfonate.

3. The compound of claim 1 named dibutylboryl p-toluenesulfonate.

4. The compound of claim 1 named diethylboryl methanesulfonate.

5. The compound of claim 1 named diethylboryl mesitylenesulfonate.

6. The compound of claim 1 named diethylboryl p-nitrobenzenesulfonate.

7. The compound of claim 1 named diethylboryl m-nitrobenzenesulfonate.

8. The compound of claim 1 named bis(diethylboryl) 4,4'-biphenyldisulfonate.

9. The compound of claim 1 named diethylboryl 2-naphthalenesulfonate.

10. The compound of claim 1 named diethylboryl p-chlorobenzenesulfonate.

11. The compound of claim 1 named bis(diethylboryl) sulfate.

12. The compound of claim 1 named diphenylboryl p-toluenesulfonate.

UNITED STATES PATENT OFFICE
CERTIFICATE OF CORRECTION

Patent No. 3,609,186                    Dated September 28, 1971

Inventor(s)  Swiatoslaw Trofimenko

It is certified that error appears in the above-identified patent and that said Letters Patent are hereby corrected as shown below:

Cover page, References cited section, "Gabeau" should read -- Goubeau --; "Zeitschript" should read -- Zeitschrift --; attorney's name should read -- James H. Ryan --. Column 1, lines 30 to 35, two R groups should be shown bonded to second B in formula (cf Formula III - Claim 1); Column 3, line 24, "$RSO_3^1$" should read -- $RSO_3^-$ --; lines 52 and 53, "(38 percent yield" should read -- (58 percent) yield --; Column 4, line 33, "blanket" should read -- blanketed --; line 59, "1,2dimethox-" should read -- 1,2-dimethox- --. Column 7, Table I, line 32, and line 35, "Dibutylbromoborane" and "dipropylchloroborane" are separate exemplifying compounds having no connection with other compounds named on same lines, capitalize first letter of "dipropylchloroborane".

Signed and sealed this 9th day of May 1972.

(SEAL)
Attest:

EDWARD M. FLETCHER, JR.                ROBERT GOTTSCHALK
Attesting Officer                      Commissioner of Patents